Patented Apr. 10, 1951

2,548,802

UNITED STATES PATENT OFFICE 2,548,802

METHOD OF INCREASING THE PARTICLE SIZE OF SYNTHETIC RUBBER LATICES

Chester E. Linscott, Ridgewood, N. J., assignor to United States Rubber Company, New York, N. Y., a corporation of New Jersey No Drawing. Application November 14, 1947, Serial No. 786,145

12 Claims. (Cl. 260—85.1)

The present invention relates to increasing the size of the dispersed polymer particles in synthetic rubber latices.

Synthetic rubber latices, as is known, may be prepared by the polymerization in aqueous medium of butadienes-1,3 or mixtures of butadienes-1,3 with other polymerizable compounds capable of forming copolymers with butadienes-1,3, emulsified by means of soap. Such aqueous emulsion polymerizates, or synthetic rubber latices, have a much smaller particle size than natural rubber latex and, because of this, difficulties arise in processes directly employing synthetic rubber latices, such as in concentrating synthetic rubber latices by creaming or centrifuging, and in directly manufacturing articles from synthetic rubber latices as in spreading or dipping operations. Processes of increasing the size of the dispersed particles in synthetic rubber latex by incorporating a salt in the latex are known. A process is known whereby the particles of synthetic latex may be enlarged by incorporating in the latex an ammonium salt, such as ammonium chloride or ammonium acetate, and formaldehyde (the formaldehyde combining with the ammonia of the ammonium salt to form hexamethylene tetramine, freeing acid in situ) to reduce the pH of latex to between 4.5 and 6.5, and thereafter raising the pH to above 9 by the addition of a base such as alkali-metal or ammonium hydroxide or an amine to prevent continued increase in particle size with subsequent destabilization.

The present invention is an improvement in the process of increasing the particle size of soap-dispersed synthetic rubber latices by reacting formaldehyde and an ammonium salt in the latex, and after the desired particle enlargement, raising the pH to above 9. By the present invention, the above process may be improved in one or more of the following ways, viz. (a) by using less ammonium salt for a given particle size increase, or causing a greater particle enlargement with a given salt addition, thereby reducing the amount of added salt and giving a dry rubber subsequently recovered from the latex containing fewer contaminants, (b) by making possible the same particle size increase at a higher pH, thus minimizing the tendency towards undue destabilization of the latex at lower pH's, (c) by reducing the time after the formaldehyde addition to accomplish a given particle size increase, thereby speeding up the process, and (d) by lowering the viscosity of the latex, thereby improving concentration of the latex by creaming and centrifuging, and making possible cream and serum separation on standing without addition of conventional hydrophilic colloidal creaming agents, such as vegetable mucilages.

In carrying out the present invention, the particle size of a synthetic rubber latex containing soap as a dispersing agent and having a pH of 9 or over is increased by reducing the pH of the latex to within the range of 4.5 to 7.5, by reacting formaldehyde and an ammonium salt in the latex in the presence of a small amount of a monohydric alcohol containing 3 to 8 carbon atoms or a cresol, and thereafter raising the pH of the latex to at least 9.

The soap used as an emulsifying and dispersing agent in the preperation of the synthetic rubber latices to which the present invention is applicable may be one or a mixture of alkali soaps of soap-forming mono-carboxylic acids having 10 to 20 carbon atoms per molecule. Such a soap-forming acid may be a member of the saturated fatty acid series ($C_nH_{2n}O_2$), or of the unsaturated fatty acid series ($C_nH_{2n-2}O_2$) or ($C_nH_{2n-4}O_2$), or may be abietic acid (including the so-called hydrogenated abietic acid, dehydrogenated abietic acid, or polymerized abietic acid). Examples of such soap-forming acids of the fatty acid series are capric, undecenoic, lauric, myristic, palmitic, margaric, stearic, oleic, linoleic and arachidic acids. The soaps may be alkali-metal, ammonium or amine soaps. The term "alkali soap" is used herein in its commonly accepted sense as referring to alkali-metal, ammonium and amine soaps and is exclusive of the alkaline-earth and other polyvalent metal salts of soap-forming acids. The term "alkali" is similarly used herein as referring to alkali-metal, ammonium and amine radicals, and is exclusive of alkaline-earth and other polyvalent metal radicals. The alkali soap used as an emulsifying agent for the monomers in the emulsion to be polymerized and as a dispersing agent for the polymer particles in the latex will generally be present in amount from 3 to 8% by weight of the solids of the latex, although larger amounts of soap may be used, and the pH of the rubber latex will be at least 9 and may be as high as 12 or over depending on the specific alkali in the soap and the amount, if any, excess alkali used.

The alcohols which will give the improvements in particle enlargement of synthetic rubber latices on addition of ammonium salt and formaldehyde to the latex, and subsequently raising the pH, are those alcohols having 3 to 8 carbon atoms; e. g. propyl alcohols, amyl alcohols, butyl alcohols, hexyl alcohols, octyl alcohols, cyclohexanol, allyl alcohol, methallyl alcohol, diacetone alcohol, terpeneol. The cresols which will give similar improvements may be the ortho, para or meta cresol, or a mixture of the same, as in commercial o-cresol. The present preferred material is isobutylalcohol. The amount of alcohol or cresol added is not critical, and may be from .5 to 5% by weight of the synthetic rubber latex. The alcohols and cresol are known to act as stabilizers and preservative for alkaline-preserved natural rubber latex and apparently similarly act as a stabilizer for the soap-dispersed synthetic rubber particles in synthetic rubber latices at the usual pH's of 9 and above, but when the pH of the latex is lowered to 7.5 or under by the addition of the ammonium salt and formaldehyde, the alcohol or cresol apparently then becomes a destabilizer and aids in the particle enlargement on reduction of the pH. The amount of ammonium salt and formaldehyde added to the latex in the presence of the alcohol or cresol should be such that the pH of the latex is reduced to 7.5 or under, but the pH should not be lowered to below 4.5 because of the tendency towards a coagulation at such low pH's. The pH of the soap-dispersed synthetic rubber latex may be reduced from 9 or above by adding formaldehyde and any ammonium salt to the synthetic rubber latex which will react with the formaldehyde to free an acid that will reduce the pH of the latex to within the range of 4.5 to 7.5. Ammonium chloride is the preferred ammonium salt, although other ammonium salts, such as ammonium acetate, formate, sulfite, oxalate, may be used.

The present invention is applicable to the particle enlargement generally of synthetic rubber latices which are emulsion polymerizates of polymerizable unsaturated monomers and which contain 3 to 8% of alkali-soap based on the solids of the latex and have a pH of at least 9. The polymerizable material in the preparation of such synthetic rubber latices may be one or a mixture of butadienes-1,3, e. g. butadiene-1,3, methyl-2-butadiene-1,3 (isoprene), chloro-2-butadiene-1,3 (chloroprene), piperylene and 2,3-dimethyl-butadiene. The polymerizable material, as is known, may be a mixture of one or more of such butadienes-1,3 with one or more other polymerizable compounds which are capable of forming rubbery copolymers with butadienes-1,3, for example, up to 70% of such mixture of one or more compounds which contain a $CH_2=C<$ group where at least one of the disconnected valences is attached to an electro-negative radical, that is, a radical which substantially increases the electrical dissymmetry or polar character of the molecule, e. g. phenyl, halogen, carbonitrilo, acetoxy and carboxy radicals. Examples of compounds which contain a $CH_2=C<$ group and are copolymerizable with butadienes-1,3 are aryl olefins, e. g. styrene, vinyl naphthalene, alpha-methyl styrene, p-methyl styrene, p-chlorostyrene, dichlorostyrenes; the alpha-methylene carboxylic acids, and their esters, nitriles and amides, e. g. acrylic acid, methacrylic acid, methyl acrylate, methyl methacrylate, methyl ethacrylate, ethyl acrylate, ethyl methacrylate, ethyl ethacrylate, acrylonitrile, methacrylonitrile, acrylamide, methacrylamide; vinyl esters of alkanoic acids, e. g. vinyl formate, vinyl acetate, vinyl propionate, vinyl butyrate; vinyl pyridine; vinyl chloride; vinylidene chloride; alkyl vinyl ethers, e. g. methyl vinyl ether, ethyl vinyl ether; alkyl vinyl ketones, e. g. methyl vinyl ketone, ethyl vinyl ketone. The average particle diameter of such synthetic rubber latices containing the conventional 3 to 8% of soap based on the latex solids is about 0.1 micron, the particles being very uniform in size. The average particle diameter of about 0.1 micron is thus the number-average as well as the volume-average particle size. The size of the Hevea particles in natural latex varies from a diameter of 0.5 micron or less to 2 to 3 microns, the particles having diameters less than 0.5 micron (from 0.1 to 0.5 micron) being present in very large numbers, e. g. over 90% of the total number of the rubber particles, but accounting for only a small proportion, e. g. less than 20% of the total mass or volume of the rubber particles. The number-average particle diameter of Hevea latex according to Lucas, "Ultraviolet Microscopy of Hevea Rubber Latex," Ind. & Eng. Chem., vol. 30, pp. 146–153 (1938) and Kemp, "Composition and Structure of Hevea Latex," id., pp. 154–158, is 0.26 micron, due to the 90 or more percent of the particles of small size (less than 0.5 micron) which make up for less than 20% of the mass or volume of the rubber. The predominating mass or volume of the rubber in Hevea latex is in the form of particles of over 0.5 micron diameter, giving a volume-average particle diameter according to Lucas of 0.89 micron. The dispersed particles in a dispersion having diameters of 0.5 micron and over are clearly visible with a light microscope at about 500 times magnification (e. g. at 480× magnification as used in the examples below), and hence the great mass of rubber particles in natural latex are visible with such a light microscope. The dispersed particles in synthetic rubber latices which have diameter of around 0.1 micron are not visible with a light microscope at about 500 times magnification. We thus have a simple method of following the particle enlargement in such synthetic rubber latices where the particles are enlarged from sub-visible size to visible size (0.5 micron and over) as viewed under the light microscope. This is a ready method of comparing the effect of various particle enlargement methods. In the examples below, which illustrate the invention, the increase in particle size of synthetic rubber latices from sub-microscopic size to the Hevea particle size range, was followed under a light microscope 480× magnification where the latices were treated with ammonium salt and formaldehyde with and without the addition of the alcohol or cresol of the present invention.

In the following examples, the alcohols or cresol, where used, were first stirred directly into the latex. After the alcohol or cresol addition (except where omitted in the checks or controls), the formaldehyde was added as an aqueous solution, followed by an aqueous solution of ammonium chloride. The amount of formaldehyde used was that which was chemically equivalent to the ammonia in the ammonium chloride in the solution, plus any free ammonia that was present. After the addition of the ammonium chloride solution and thoroughly mixing of the reagents, stirring was stopped and the latex was allowed to stand, whereupon the pH slowly fell and enlargement took place. Times and pH's were noted when the particle size of the treated synthetic rubber latex, as viewed in the light microscope at 480× magnification, approximated that of normal Hevea latex. A base was then added to stabilize the synthetic rubber latex of increased particle size. In the examples, all parts recited are by weight.

Example I

A 28% solids synthetic rubber latex prepared by polymerizing an aqueous emulsion of 75 parts by weight of butadiene-1,3 and 25 parts by weight of styrene in the presence of a small amount of conventional oxidizing catalyst, and containing about 6.5 parts by weight of commercial sodium stearate soap, based on the latex solids, was used in Examples I to III. The latex had a pH of 9.0 and an average particle diameter of about 0.1 micron. To 100 parts of the latex was added 2 parts of cyclohexanol, 2.13 parts of aqueous 37.6% formaldehyde, and 6 parts of aqueous 10% ammonium chloride solution. The latex particles enlarged to Hevea range in 76 minutes, the pH dropping to 5.7. With 1.45 parts of n-amyl alcohol instead of the 2 parts of cyclohexanol, the particles enlarged to the Hevea range in 72 minutes, the pH dropping to 5.7. With 2.8 parts of isobutyl alcohol instead of 2 parts of cyclohexanol, the particles enlarged to the Hevea range in 69 minutes, the pH dropping to 5.6. In the control where no alcohol was added, to 100 parts of the latex was added 3.72 parts of aqueous 37.6 formaldehyde and 10.5 parts of aqueous 10% ammonium chloride solution. The particles enlarged to the Hevea range only after 123 minutes, the pH of the treated latex dropping to 4.68. In all cases after the particle enlargement to Hevea range, aqueous solutions of a base (potassium hydroxide, ammonium hydroxide or diethylamine) were added to raise the pH to 9.6 to 9.8. It may readily be seen that the alcohols reduced the amount of salt and the time necessary to increase the particle size to the Hevea range and accomplished this at a higher pH.

Example II

A portion of the latex of Example I was increased to Hevea particle size range by adding to 100 parts of the latex 2.8 parts of isobutyl alcohol, 2.13 parts of aqueous 37.6% formaldehyde, 6 parts of aqueous ammonium chloride solution, allowing the thus treated latex to stand to the enlargement of particles to Hevea size, and then adding 3 parts of aqueous 28.5% ammonia. Another portion was similarly treated but with 1.45 parts of n-amyl alcohol instead of 2.8 parts of isobutyl alcohol. To a third 100 part portion of the latex (control) was added 3.73 parts of aqueous 37.6% formaldehyde and 10.5 parts of aqueous 10% ammonium chloride solution. After standing until increase in the particle size to the Hevea range, 9 parts of aqueous 28.5% ammonia was added. The pH's of the three samples after the ammonium hydroxide addition was between 9.5 and 10. The samples treated with the isobutyl alcohol and n-amyl alcohol were centrifuged 50 to 60 minutes and gave centrifuge creams of 65.9 and 68.3% total solids respectively, and centrifuge skims of 3.0% and 3.2% total solids respectively. No butter formed around the spindle inside the bowl. In the case of the latex to which no alcohol had been added, a similar run gave a concentrate from the centrifuge spout of 64.4% total solids and a centrifuge skim of 2.7% total solids, but at the same time a butter of 71.6% total solids was formed around the spindle inside the bowl. The centrifugations were made at room temperature and the undesirable butter formation is usual with synthetic rubber latex centrifuging at room temperature. The application of heat during the centrifuging may reduce or eliminate the butter formation where no alcohol was added in the particle enlargement step. However, the addition of the alcohol in the particle enlargement step makes unnecessary the application of heat during the centrifuging in successfully centrifuging without butter formation.

Example III

To 100 part portions of the latex of Example I were added 1, 1.25, 1.4 and 1.45 parts respectively of n-amyl alcohol. To each portion was added 2.13 parts of aqueous 37.6% formaldehyde and 6 parts of aqueous 10% ammonium chloride solution. The time for enlargement of the particles to the Hevea size was noted in each case. The portion containing 1.0 part of n-amyl alcohol took 22 hours to enlarge to Hevea particle size. The portion containing 1.25 parts of n-amyl alcohol took 2 hours. The portion containing 1.4 parts of n-amyl alcohol took 97 minutes, and the portion containing 1.45 parts took 72 minutes. The pH of the samples at the Hevea enlargement stage was about 5.7 and the pH of all samples was raised to above 9 by the addition of aqueous 28% ammonia.

The above clearly demonstrates that the time of particle enlargement to a given particle size using a given amount of formaldehyde and ammonium chloride may be reduced with increased alcohol additions.

Example IV

In this example a synthetic rubber latex similar to that of Example I but having a 38.3% solids concentration was used. The sodium stearate content of the latex was 6.5% based on the latex solids, the pH was 9.2, and the average particle diameter was about 0.1 micron. To 5 portions of this latex were added various amounts of cyclohexanol and from .5 to 5 parts per 100 parts of the latex. To one portion of the latex no alcohol was added. Formaldehyde and ammonium chloride were then added to these latex portions, smaller amounts being added to those portions having the larger cyclohexanol content. The various portions were allowed to stand after the formaldehyde and ammonium chloride additions until enlargement of the particles to the Hevea range where times and pH's were noted. The pH of all the samples was then raised to above 9 by addition of a base. The data is shown in the following table:

[Parts by weight.]

| | | | | | | |
|---|---|---|---|---|---|---|
| Latex | 100 | 100 | 100 | 100 | 100 | 100 |
| Cyclohexanol | 0 | 0.5 | 1 | 2 | 3 | 5 |
| 10% aqueous formaldehyde | 14 | 11 | 10 | 7 | 6 | 4 |
| 10% aqueous chloride solution | 10.5 | 8.3 | 7.5 | 5.3 | 4.5 | 3 |

The times that the latex had to stand until enlargement of particles to Hevea size are:

| | | | | | | |
|---|---|---|---|---|---|---|
| Time standing (min.) | 98 | 123 | 121 | 99 | 139 | 80 |
| pH at end of enlargement period | 5.0 | 5.2 | 5.5 | 6.5 | 6.8 | 7.2 |

Details of the addition of base and resultant pH after particle enlargement are:

[Parts by weight.]

| Base added: | | | | | | |
|---|---|---|---|---|---|---|
| 2-normal aqueous potassium hydroxide | 10.25 | 10 | 15 | ---- | 3.75 | ---- |
| 32.1% aqueous diethylamine | ---- | ---- | ---- | 2.4 | ---- | ---- |
| 28.5% aqueous ammonia | ---- | ---- | ---- | ---- | ---- | 3.6 |
| pH after addition of base | 9.8 | 11.9 | 11.6 | 9.9 | 9.5 | 10 |

The above data shows that as the amount of alcohol is increased, the amount of formaldehyde and ammonium chloride may be decreased and the particle enlargement to approximately Hevea size will take place at an increasing pH level.

Example V

A 38% solids synthetic rubber latex prepared by polymerizing an aqueous emulsion of 50 parts by weight of butadiene and 50 parts by weight of styrene in the presence of a small amount of conventional oxidizing catalyst, and containing about 8 parts by weight of sodium abietate soap per 100 parts of latex solids, was used in this example. The latex had a pH of 9.9 and an average particle diameter of about 0.1 micron. To one portion of 100 parts of the latex was added 3 parts of diacetone-alcohol, 2.1 parts of aqueous 37.6% formaldehyde and 20 parts of aqueous 3% ammonia chloride solution. After 46 minutes standing, the particle size had enlarged to the Hevea range, the pH dropping to 6.08. After the 46 minute standing period, 6 parts of aqueous 25% monoethanolamine was added raising the pH to 9.6. To a second portion of 100 parts of the latex was added 2 parts of isopropyl alcohol and 1 part of cyclohexanol in 2 parts of water, followed by 2.0 parts of aqueous 37.6% formaldehyde and 23 parts of aqueous 2.5% ammonium chloride solution. After standing 88 minutes, the particles had enlarged to the Hevea range, the pH dropping to 6.44. After the 88 minute standing period 6 parts of aqueous 25% monoethanolamine was added raising the pH to 9.7. To a third (control) portion of 100 parts of the latex was added 2.1 parts of aqueous 37.6% formaldehyde, and 20 parts of aqueous 3% ammonium chloride solution but no alcohol. In this case where no alcohol was added, the latex had to stand 22 hours before enlargement of the particles to the Hevea range. The pH dropped to 5.47. After the 22 hour standing period, 6.3 parts of aqueous 25% monoethanolamine was added raising the pH to 9.8. The three thus treated portions were allowed to stand 144 hours after the monoethanolamine additions. After this time, the latex to which the diacetone had been added had spontaneously separated into cream and serum portions, 75% by volume of the latex as a sub-natant yellow-white serum. In the case of the latex to which the isopropyl alcohol and cyclohexanol had been added, the latex had separated into cream and serum portions, the cream being 51% by volume of the latex and the serum being 49% by volume of the latex as a white serum. After the 144 hours standing, the latex to which no alcohol had been added did not show any separation into cream and serum portions.

Example VI

A synthetic rubber latex, similar to that used in Example I, having 28.7% solids content and a pH of 9.2 was used in this example. To 100 parts of latex was added 2.8 parts of isobutyl alcohol, 2.17 parts of aqueous 36.8% formaldehyde, and 6 parts of aqueous 10% ammonium chloride solution. After 90 minutes, the particles of the latex enlarged to approximately Hevea size, the pH dropping to 5.8. After the 90 minute standing period, 4 parts of aqueous 28.5% ammonia were added, raising the pH to 10.0. The thus treated latex was stirred for 10 minutes and allowed to stand overnight. After 16 hours, the latex had separated into 61% by volume of a cream having 41.2% solids, and 39% by volume of clear brown serum having 2.83% solids. The cream portion was then centrifuged and it produced a cream of 59.4% solids and a skim of 3.1% solids. With similar treatment of the latex but without the isobutyl alcohol addition, no spontaneous creaming occurred overnight.

Example VII

In this example a latex similar to the latex of Example I, having a 28.7% solids content and a pH of 9.0 was used. To 100 parts of the latex was added 2.23 parts of aqueous 37.6% formaldehyde and 6.25 parts of aqueous 10% ammonium chloride solution. After 2 weeks standing the particle size had not increased to the size range of Hevea particles. Another 100 part portion of the latex similarly treated but with the addition of 2.5 parts of n-hexyl alcohol prior to the formaldehyde and ammonium chloride additions, gave an increase in particle size to the Hevea range in 95 minutes. Another 100 part portion of the latex to which 2.5 parts of 2-ethylhexanol were added prior to the same formaldehyde and ammonium chloride additions, gave particle enlargement to Hevea size in 13 minutes. Another 100 part portion of the latex to which 2.5 parts of allyl alcohol had been added prior to the same formaldehyde and ammonium chloride additions gave particle enlargement to Hevea size in 3 days. Another 100 part portion of the latex to which 2.5 parts of methallyl alcohol had been added prior to the same formaldehyde and ammonium chloride additions gave particle enlargement to Hevea size in 21 hours. Another 100 part portion of the latex to which 2.5 parts of n-butyl alcohol had been added prior to the same formaldehyde and ammonium chloride additions gave increase in particle size to the Hevea range in 10 minutes. Another 100 part portion of the latex to which 3.9 parts of terpeneol had been added prior to the same formaldehyde and ammonium chloride additions gave particle enlargement to Hevea size in 16 minutes. Another 100 part portion of the latex to which 1 part of o-cresol had been added prior to the same formaldehyde and ammonium chloride additions gave particle enlargement to Hevea size in 38 minutes. The latex in all eight samples was stabilized by the addition of aqueous 28% ammonia to bring the pH above 9, after the particle enlargement periods of standing. It may readily be seen that with the amounts of formaldehyde and ammonium chloride used in the above cases, there is no particle enlargement to Hevea size in a reasonable time unless there is also present a small amount of an alcohol or cresol.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the size of the dispersed polymer particles in a synthetic rubber latex comprising an aqueous emulsion polymerizate of polymerizable material selected from the group consisting of dienes of the group consisting of butadiene-1,3, isoprene, chloroprene, piperylene and 2,3-dimethyl-butadiene-1,3, and mixtures of such dienes with compounds which contain a $CH_2=C<$ group and are capable of forming copolymers with such dienes, said latex containing 3 to 8 parts by weight of alkali soap per 100 parts of latex solids and having a pH of at least 9, which comprises reducing the pH of the latex to within the range of 4.5 to 7.5 by reacting formaldehyde and an ammonium salt in the latex in the presence of 0.5 to 5% based on the weight of the latex of hydroxy compound consisting solely of the elements C, H and O and selected from the group consisting of propyl alcohols, amyl alcohols, butyl alcohols, hexyl alcohols, octyl alcohols, cyclohexanol, allyl alcohol, methallyl alcohol, diacetone alcohol, terpeneol, ortho-cresol, para-cresol and meta-cresol, and thereafter increasing the pH of the latex to at least 9.

2. The method of increasing the size of the dispersed polymer particles in a synthetic rubber latex comprising an aqueous emulsion polymerizate of a mixture of butadiene-1,3 with a compound which contains a $CH_2=C<$ group and is copolymerizable with butadiene-1,3, said latex containing 3 to 8 parts by weight of alkali soap per 100 parts of latex solids and having a pH of at least 9, which comprises reducing the pH of the latex to within the range of 4.5 to 7.5 by reacting formaldehyde and an ammonium salt in the latex in the presence of 0.5 to 5% of monohydric alcohol consisting solely of the elements C, H and O and having 3 to 8 carbon atoms based on the weight of the latex, and thereafter increasing the pH of the latex to at least 9.

3. The method of increasing the size of the dispersed polymer particles in a synthetic rubber latex comprising an aqueous emulsion polymerizate of a mixture of butadiene-1,3 and styrene containing 3 to 8 parts by weight of alkali soap per 100 parts of latex solids and having a pH of at least 9, which comprises reducing the pH of the latex to within the range of 4.5 to 7.5 by reacting formaldehyde and an ammonium salt in the latex in the presence of 0.5 to 5% of isobutyl alcohol based on the weight of the latex, and thereafter increasing the pH of the latex to at least 9.

4. The method of claim 1 in which the pH of the latex is raised by addition of alkali-metal hydroxide to the latex.

5. The method of claim 1 in which the pH of the latex is raised by addition of ammonium hydroxide to the latex.

6. The method of claim 1 in which the pH of the latex is raised by the addition of an amine to the latex.

7. The method of claim 2 in which the pH of the latex is raised by addition of alkali-metal hydroxide to the latex.

8. The method of claim 2 in which the pH of the latex is raised by addition of ammonium hydroxide to the latex.

9. The method of claim 2 in which the pH of the latex is raised by the addition of an amine to the latex.

10. The method of claim 3 in which the pH of the latex is raised by addition of alkali-metal hydroxide to the latex.

11. The method of claim 3 in which the pH of the latex is raised by addition of ammonium hydroxide to the latex.

12. The method of claim 3 in which the pH of the latex is raised by the addition of an amine to the latex.

CHESTER E. LINSCOTT.

REFERENCES CITED

The following references are of record in the file of this patent:

UNITED STATES PATENTS

| Number | Name | Date |
|---|---|---|
| 2,446,115 | Svendsen | July 27, 1948 |
| 2,462,591 | Arundale | Feb. 22, 1949 |